Patented Apr. 26, 1949

2,468,577

UNITED STATES PATENT OFFICE 2,468,577

PROCESS OF PREPARING OMEGA KETONES USABLE AS INTERMEDIATE PRODUCTS FOR THE MANUFACTURE OF POLYMETHINE DYES

André E. Van Dormael, Heverlee, near Louvain, and Theofiel H. Ghys, Antwerp, Belgium, assignors to Gevaert Photo-Producten N. V., Mortsel, near Antwerp, Belgium, a company of Belgium No Drawing. Application December 2, 1946, Serial No. 713,454. In Belgium December 6, 1945

5 Claims. (Cl. 260—304)

This invention relates to a process for preparing omega ketones which may be used as intermediate products for the manufacture of polymethine dyestuffs.

Hitherto, such omega ketones were obtained by the reaction of an acyl halide upon a cyclammonium salt bearing a reactive methyl group in alpha position. This conversion, however, is restricted to N-alkyl arylothiazoles or aryloselenazoles.

It is further known to prepare omega ketones by starting from cyclammonium salts with a reactive thioether group. This reactive thioether group is converted into a dicarbalkoxy-methylene group which in turn is converted into a reactive methyl group. Said reactive methyl group, as noted above, is converted into an omega ketone by means of an acylhalide. Thus, deviously, one obtains the corresponding N-aryl substituted omega ketones, since N-aryl cyclammonium salts with a reactive thioether group can be prepared with ease.

Omega ketones can also be prepared by first converting the thioether group of corresponding N-alkyl-, N-aryl- or N-aralkyl cyclammonium salts into a diacylmethylene group and next, by hydrolysis, said diacylmethylene group into an omega ketone. Though hereby the field of the omega ketones which hitherto could be prepared is increased, yet the process of their manufacture remains complicated. Furthermore, strong HCl must be used at boiling temperature in order to effect the hydrolysis, which has deleterious effects upon the substances present.

Now we have found that omega ketones can be derived, without using any intermediate product, from cyclammonium salts with a reactive thioether group. Actually, this is done by converting the said thioether group into a ketone group by means of acyl acetic acid and in the presence of an acid binding agent.

We hereafter give a reaction which would illustrate the invention:

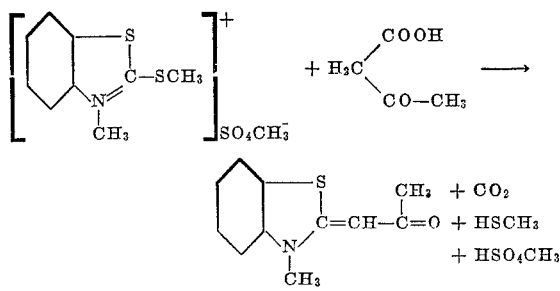

In this way, the use of both strong acids and high temperature can be avoided, with the result that neither the splitting of the heterocyclic nucleus of the cyclammonium compounds, nor the saponification of substituents, optionally present in the nucleus, has to be feared. On the other hand, an excess of unaltered acyl acetic acid does not harm, because the said acid splits easily into $CO_2$ and into corresponding ketone.

The following examples illustrate the invention. It is, however, especially to be remarked that the examples do not restrict the scope of the invention which can be applied to all heterocyclic quaternary compounds as used in the chemistry of the cyanines.

*Example 1.*—3.1 g. (1 mol) 2-methylmercaptobenzthiazole-dimethyl sulphate are dissolved in 10 cm.³ absolute ethyl alcohol. Next, 3.1 g. (3 mol) freshly prepared acetyl acetic acid are added to the mixture. 1.5 cm.³ (1.1 mol) triethylamine are dropwise added and condensation starts. This condensation is completed by boiling for some minutes the reaction mixture. After cooling, the 2-acetylmethylene-N-methyl-2-3-dihydrobenzthiazole formed:

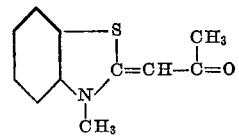

is precipitated with water and filtered, thereby using a filter pump. The melting point after one recrystallisation from benzine is 157°–158° C.

*Example 2.*—3.9 g. (1 mol) 2-ethylmercaptobenzthiazole-ethyl-p-toluene sulphonate are treated with 2.5 g. (2.5 mol) acetyl acetic acid in 10 cm.³ of absolute alcohol. Next 1.5 cm.³ (1.1 mol) triethylamine are dropwise added. After boiling up for a while, the solution is cooled and the 2-acetylmethylene-N-ethyl-2-3-dihydrobenzthiazole formed:

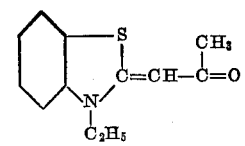

is precipitated with water, filtered and once recrystallised from benzine. The melting point is 112°–113° C.

*Example 3.*—2.7 g. (0.5 mol) N,N-dimethylene-di-(2-methylmercapto-benzthiazole bromide) are treated with 3.1 g. (3 mol) acetyl acetic acid in 10 cm.³ absolute ethyl alcohol. Next, 1.5 cm.³

(1.1 mol) triethylamine are added. After boiling for awhile, the N,N-dimethylene-di-(2-acetyl-methylene-2-3-dihydrobenzthiazole) formed:

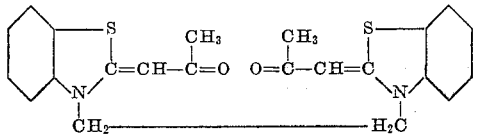

is precipitated with ice-water. It has a melting point of 152°–153° C. after only one recrystallisation from benzine. (Regarding the preparation of the cyclammonium quaternary salt mentioned in this example, see French Patent 912,661, Example 10.)

We claim:

1. A process for preparing omega ketones, which comprises condensing in the presence of an acid binding agent acetyl acetic acid with a benzthiazolium quaternary salt bearing at position 2 a reactive thioether group.

2. A process for preparing omega ketones, which comprises condensing in the presence of triethylamine acetyl acetic acid with a benzthiazolium quaternary salt bearing at position 2 a reactive thioether group.

3. A process for preparing an omega ketone which comprises condensing in the presence of an acid binding agent acetyl acetic acid with 2-methylmercapto-benzthiazolium quaternary salt.

4. A process for preparing an omega ketone which comprises condensing in the presence of an acid binding agent acetyl acetic acid with 2-ethylmercapto-benzthiazolium quaternary salt.

5. A process for preparing an omega ketone which comprises condensing in the presence of an acid binding agent acetyl acetic acid with N,N-dimethylene-di-(2-methylmercapto-benzthiazolium) quaternary salt.

ANDRÉ E. VAN DORMAEL.
THEOFIEL H. GHYS.

No references cited.